No. 629,967. Patented Aug. 1, 1899.
C. W. & C. H. PECK.
PNEUMATIC TOOL.
(Application filed Apr. 20, 1899.)
(No Model.) 2 Sheets—Sheet 1.
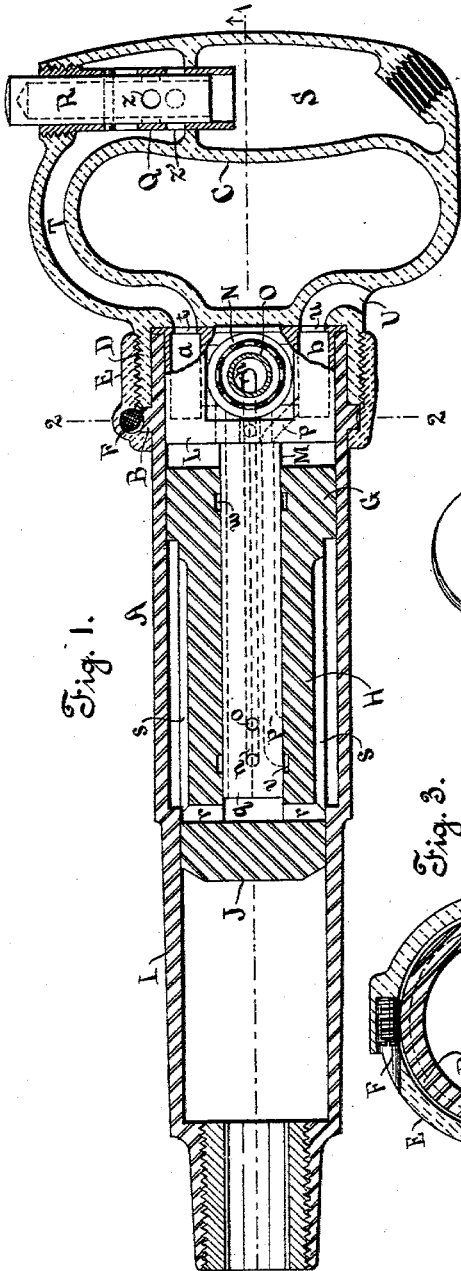
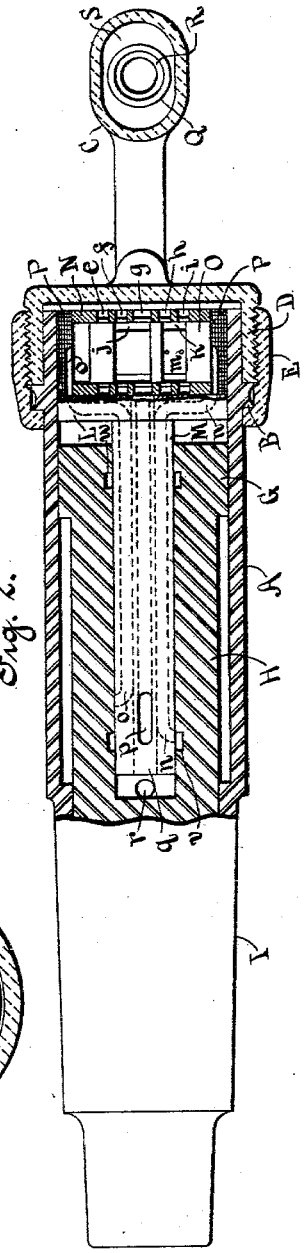
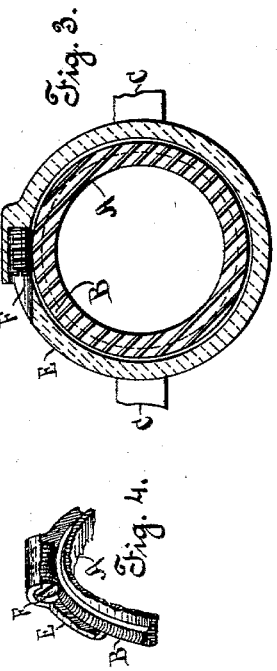
WITNESSES:
INVENTORS
Clarence W. Peck
Caid H. Peck
BY
Eugene Dixen
ATTORNEY

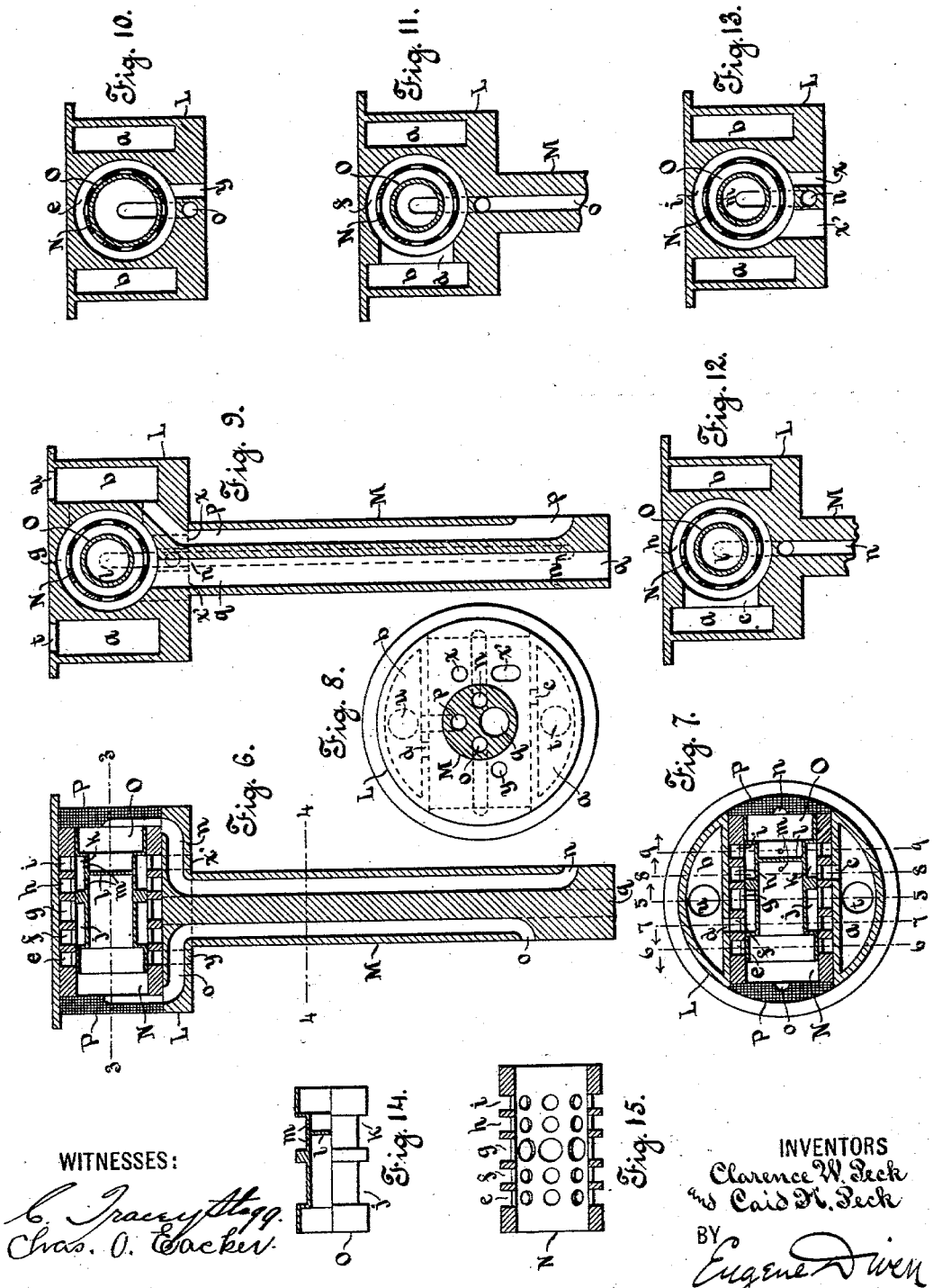

UNITED STATES PATENT OFFICE.

CLARENCE W. PECK AND CAID H. PECK, OF ELMIRA, NEW YORK; SAID CAID H. PECK ASSIGNOR TO SAID CLARENCE W. PECK.

PNEUMATIC TOOL.

SPECIFICATION forming part of Letters Patent No. 629,967, dated August 1, 1899.

Application filed April 20, 1899. Serial No. 713,811. (No model.)

*To all whom it may concern:*

Be it known that we, CLARENCE W. PECK and CAID H. PECK, citizens of the United States, residing at Elmira, in the county of Chemung and State of New York, have invented certain new and useful Improvements in Pneumatic Tools, of which the following is a specification.

Our invention relates to improvements in pneumatic hand-tools wherein a reciprocating piston actuated by compressed air is made to drive various tools, such as used in chipping, calking, drilling, and other operations; and the object of our improvements is to provide a tool of this nature wherein new and improved results may be attained, to which end our invention comprises certain novel features of construction, as will appear hereinafter and be more particularly pointed out in our claims.

We attain the object of our improvements by the construction and mechanisms illustrated in the accompanying drawings, wherein we have shown our invention as applied to a pneumatic hammer, and in which—

Figure 1 represents a side elevation of our complete tool, parts being shown in medial cross-section; Fig. 2, a bottom view of the same, parts being shown in section on the line 1 1 in Fig. 1 looking in the direction of the arrows; Fig. 3, a cross-section on the line 2 2 in Fig. 1, certain parts being omitted; Fig. 4, a detail in perspective of a portion of Fig. 3; Fig. 5, an end view of the bushing which receives the tool; Fig. 6, a cross-section of the valve-box L and its stem-piece M on the line 1 1 in Fig. 1; Fig. 7, a section of the valve-box on the line 3 3 in Fig. 6; Fig. 8, a section on the line 4 4 in Fig. 6 looking in the direction of the valve-box; Fig. 9, a section through the valve-box and stem on the line 5 5 in Fig. 7 looking in the direction of the arrows; Figs. 10, 11, 12, and 13, sections on the lines 6 6, 7 7, 8 8, and 9 9, respectively, in Fig. 7 looking in the direction of the arrows; and Figs. 14 and 15, details showing the valve and the ported bushing which with the valve-box forms the valve-chamber.

Similar letters refer to similar parts throughout the several views.

A represents a cylinder having near one end a collar B. A handle C, provided with a threaded sleeve, slips over the end of the cylinder A and is secured to said cylinder by means of the coupling-swivel E, which slips over the collar B. In order to hold the handle C in proper position after the coupling is screwed home, a lock-screw F is provided, which by engaging screw-threads cut on the periphery of the collar B prevents swivel E from turning in either direction, as shown more particularly in Figs. 3 and 4. Within the cylinder A is a piston G, from which extends a piston-rod H, said piston-rod H traveling in the guideway I, which is formed by a reduced extension of the cylinder A.

J is a hammer-face on the end of the piston-rod.

A bushing K is screwed into the reduced end of the guideway I and is provided with an aperture to receive a tool-shank, which may be either round or square, as shown in Fig. 5, to the end that some tools, as when drilling, may be turned by one hand while operating the hammer with the other and other tools may be held from turning in the hammer, as the work to be performed requires. A valve-box L is inserted at the open end of the cylinder A and secured in place by means of a flange, which is clamped between the handle C and the end of the cylinder.

M is a cylindrical stem extending outwardly from the valve-box and into a central bore in the piston and piston-rod, which it fits closely.

The valve-box L is provided with a transverse diametrical bore, in which is a ported bushing N, the ends of the bore and bushing being closed by cheek-pieces P P of rawhide or other suitable material. Within the valve-chamber formed by the bushing N and the cheek-pieces P P is a hollow piston-valve O.

At each side of the transverse bore of the valve-box L is a segmental chamber, one of said chambers *a* constituting an admission-chamber and the other, *b*, an exhaust-chamber, to and from which lead the various ports and passages by which the air is admitted to or exhausted from the opposite sides of the valve O and piston G. The bushing N is provided with a series of annular ports *e*, *f*, *g*, *h*, and *i*, communicating with the valve-ports $j$ and $k$ by perforations, as shown in Fig. 15. A diaphragm $l$ is located near one end of the valve O, at each side of which are two small holes $m$, forming a communication between the interior of the valve at each side of the diaphragm and the port $k$. The stem M is provided with four long ports $n$, $o$, $p$, and $q$. The ports $n$ and $o$ are of unequal length and are bent around in box L to register with passages cut in the cheek-pieces P P to communicate with the valve-chamber at each end thereof. $p$ is a port corresponding in diameter to the ports $n$ and $o$ and communicating with the exhaust-chamber, (see Fig. 9,) the opening of said port from the side of stem M having its extremities on a line with the openings from ports $n$ and $o$, respectively, as shown in Figs. 1 and 2. A large port $q$ passes from end to end of the stem and communicates with the port $g$ in bushing N at one end and the bottom of the bore in the piston-rod at the other.

$r$ $r$ are two lateral ports leading from the bottom of the bore of the piston-rod and intended to bring ports $n$ and $o$ into communication with port $p$ at the ends of the piston-strokes, as will hereinafter appear.

The handle C is provided with a supply-chamber S, to which is attached the air-hose by a suitable coupling. Separated from this supply-chamber by a diaphragm is an inlet-passage T, which communicates with the admission-chamber $a$ through port $t$. A perforated bushing Q is screwed into the top of the handle and passes through the diaphragm separating chamber S from the inlet-passage T and forms a valve-chamber for the hollow piston-valve R, which is reciprocated therein by downward pressure of the thumb or finger, being held in proper alinement with the ports in bushing Q by a pin-and-slot connection. When the valve R is pushed downward, the series of ports $z$ will register more or less with the series of ports $z'$ in the bushing Q and admission from supply-chamber S to inlet-passage T will be regulated accordingly. It will be seen that the valve R is a self-closing valve, as it is closed and held closed normally by the air-pressure in supply-chamber S. U is the exhaust-outlet and communicates with the exhaust-chamber $b$ by way of the port $u$.

Having thus pointed out and named the various parts of our device, the operation thereof is as follows: The air-hose having been coupled to chamber S and pressure applied to the valve R, so as to bring ports $z$ and $z'$ into register more or less according to the strength of blow desired, air will be admitted through passage T to admission-chamber $a$, thence passing through port $c$ into port $h$ of the bushing N. From the port $h$ the air passes by way of port $k$ (the valve O being in the position shown in the several views) to port $i$, and thence through ports $x$ $x'$ to the rear of the piston G, this admission of air to the piston driving the piston-rod and hammer-face outward to strike the tool with the desired blow. Air ahead of the piston during the forward stroke passes to exhaust-chamber $b$ by way of grooves $s$ $s$ and ports $r$ $r$, $q$, $g$, $j$, $f$, and $d$. When the piston has reached the end of its outward stroke, the groove $w$ will cause port $o$ to communicate with port $p$. This places the valve-chamber in communication through port $o$ with the exhaust. The port $n$ having been closed to the port $p$ by the forward movement of the piston-rod, air will now pass from port $k$ into the valve O through the small holes $m$ on each side of the diaphragm $l$; but as one side of the valve is in communication through port $o$ with the exhaust the pressure on the other side will force the valve over to the opposite position from that shown in Fig. 2. In this new position of the valve port $c$ from the admission-chamber $a$ is brought into communication with port $g$ and closed to port $i$. Air will therefore pass from the admission-chamber $a$ through ports $c$, $k$, $g$, and $q$ to the ports $r$ and thence along the grooves $s$ $s$ to the opposite or forward side of the piston G, forcing the piston slowly back to its original position, exhaust from the rear of the piston taking place through ports $y$, $e$, $j$, $f$, and $d$ to exhaust-chamber $b$. As soon as the piston is brought back to its original position the ports $n$ and $p$ will be placed in communication with one another by way of the groove $v$, thus placing the valve-chamber in communication with the exhaust through ports $n$ and $p$ and causing the valve O to be shifted back to its original position by reason of the air passing through the small openings $m$ on each side of the diaphragm $l$ in the manner hereinbefore described. As the valve-chamber is open to the exhaust at either end for short periods only, while the piston pauses at the ends of its stroke, and as the holes $m$ are small, it will be seen that a very small quantity of the air-supply is used in shifting the valve. It will be seen, further, that by reason of the large port area furnished by the ports $x$ $x'$ for admission to the rear or large end of the piston G air may be admitted thereto with the full force of the air-pressure, and by reason of the smaller exhaust-port $y$ and the action of the air upon the smaller area at the opposite side of the piston the return stroke of the piston will be slow in comparison with the forward or striking stroke, the force and rapidity of the blows being regulated by the amount of opening through ports $z$ $z'$ as adjusted by the valve R. The action of the piston-valve O will be noiseless, as it impinges at each end of its stroke upon the cushioning cheek-pieces P P.

The operation of the device is automatic and is entirely under the control of the operator through the valve R.

By placing the grooves $v$ $w$ closer together a shorter stroke may be given the piston, and the same tool may therefore be provided with several pistons and rods having different arrangements of the grooves, by the insertion of which any desired stroke may be attained within the capabilities of a given tool. The relative positions of the openings from ports *n*, *o*, and *p* may also be varied to change the length of piston-stroke, and we do not confine ourselves, therefore, to any particular relative arrangement of these ports and grooves. Also instead of driving a hammer-face the piston may be coupled by its rod to various other tools for imparting motion thereto.

Having thus described our improvements, what we claim as our invention, and desire to secure by Letters Patent, is—

1. A pneumatic tool comprising a cylinder, a piston and a piston-rod reciprocating therein, a valve-box closing one end of the cylinder, a valve-chamber in the valve-box, a valve reciprocating therein, an admission-chamber and an exhaust-chamber in the valve-box, a stem projecting from the valve-box into a bore in the piston-rod, means for admitting air under pressure to the admission-chamber, and ports and passages whereby the opposite sides of the valve and piston are placed in alternate communication with the admission and exhaust chambers.

2. A pneumatic tool comprising a cylinder, a piston and a piston-rod reciprocating therein, a valve-box closing one end of the cylinder, a transverse bore in the valve-box, a ported bushing in said bore, a piston-valve reciprocating in said bushing, an admission-chamber and an exhaust-chamber in the valve-box one at each side of said bushing, a stem projecting from the valve-box into a bore in the piston-rod, means for admitting air under pressure to the admission-chamber, and ports and passages in the several parts whereby the opposite sides of the valve and piston are placed in alternate communication with the admission and exhaust chambers.

3. A pneumatic tool comprising a cylinder, a piston and a piston-rod reciprocating therein, a cylindrical guideway for the piston-rod at one end of the cylinder, a valve-box closing the other end of the cylinder, a stem projecting from the valve-box into a bore in the piston-rod, a port or ports at the end of said bore, a longitudinal groove or grooves along the outside of the piston-rod opening into said port or ports, a valve-chamber in the valve-box, a reciprocating valve therein, and ports and passages in the valve-box and stem whereby air under pressure may be admitted to and exhausted from the opposite sides of the piston.

4. A pneumatic tool comprising a cylinder, a piston and piston-rod reciprocating therein, a valve-box closing one end of the cylinder, a stem projecting from the valve-box into a bore in the piston-rod, a valve-chamber in the valve-box, a hollow piston-valve therein, a diaphragm in said valve, passages leading from the admission-port of the valve to the interior on opposite sides of the diaphragm, two ports leading from opposite ends of the valve-chamber into and partly through said stem, a third port leading from the exhaust into and partly through said stem, a groove near each end of the piston-rod bore whereby said port from the exhaust is placed in alternate communication with the ports to the ends of the valve-chamber when the piston is at the ends of its stroke, and ports and passages controlled by the valve to actuate the piston.

5. A pneumatic tool comprising a cylinder, a chambered handle coupled to one end thereof, a tool-holder at the opposite end thereof, a valve-box in the cylinder adjacent to the handle, a piston and a piston-rod reciprocating in the cylinder, admission and exhaust chambers in the valve-box registering with inlet and exhaust passages in the handle, a valve-chamber in the valve-box, a piston-valve therein, a stem projecting from the valve-box into a bore in the piston-rod, and ports and passages in the several parts whereby the valve is automatically shifted and the piston reciprocated when air under pressure is admitted through the handle.

6. In a pneumatic tool, the combination of a cylinder, a piston reciprocating therein, a valve-box at one end of the cylinder, a handle having a valve-controlled inlet-passage, a screw-threaded sleeve on the handle fitting over the end of the cylinder, a screw-threaded collar on the cylinder, a coupling-swivel turning against said collar, and a lock-screw in the peripheral wall of said swivel to engage said collar and lock the handle in proper alinement with the valve-box.

7. In a handle for pneumatic tools, the combination of the supply-chamber S to which the air-hose is coupled; the inlet-passage T leading therefrom through which air is supplied to the working parts of the tool, a diaphragm separating said chamber and passage, the cylindrical valve-case Q opening into said chamber through the diaphragm with ports leading to said passage, the valve R reciprocating in said case and held normally closed by the air-pressure in the supply-chamber, and a valve-stem projecting outside the handle whereby the valve may be pressed inward by the operator to open communication between said chamber and passage.

8. The combination, with the cylinder of a pneumatic tool, of a valve-box therefor comprising a cylindrical shell fitting the end of the cylinder, a transverse bore in said shell, an admission-chamber and an exhaust-chamber one at each side of said bore, a ported bushing in said bore, cushioning cheek-pieces closing the ends of said bore and bushing, a piston-valve reciprocating in the bushing, and ports from said bore connecting the admission-chamber, the exhaust-chamber and the cylinder with the ports around the bushing.

In testimony whereof we have affixed our signatures in presence of two witnesses.

CLARENCE W. PECK.
CAID H. PECK.

Witnesses:
C. TRACEYSTAGG,
A. S. DIVEN.